United States Patent
Vega et al.

(10) Patent No.: US 11,623,538 B1
(45) Date of Patent: Apr. 11, 2023

(54) EJECTOR FOR ELECTRIC VEHICLE CHARGING CONNECTORS

(71) Applicant: Mod.al Group, Inc., American Fork, UT (US)

(72) Inventors: Erick Vega, Salt Lake City, UT (US); Preston Ruff, Draper, UT (US); Kreg Peeler, Draper, UT (US)

(73) Assignee: Mod.al Group, Inc., American Fork, UT (US)

( * ) Notice: Subject to any disclaimer, the term of this patent is extended or adjusted under 35 U.S.C. 154(b) by 0 days.

(21) Appl. No.: 17/494,456

(22) Filed: Oct. 5, 2021

(51) Int. Cl.
*B60L 53/35* (2019.01)
*B60L 53/16* (2019.01)
*H01R 13/66* (2006.01)
*H01R 13/635* (2006.01)

(52) U.S. Cl.
CPC ............. *B60L 53/35* (2019.02); *B60L 53/16* (2019.02); *H01R 13/635* (2013.01); *H01R 13/6691* (2013.01); *H01R 2201/26* (2013.01)

(58) Field of Classification Search
CPC ............. H01R 13/633; H01R 13/635; H01R 13/62933; H01R 13/629; H01R 13/6691; H01R 2201/26; B60L 53/35; B60L 53/16
USPC .................................................. 439/152, 310
See application file for complete search history.

(56) References Cited

U.S. PATENT DOCUMENTS

| | | | | |
|---|---|---|---|---|
| 4,091,318 A * | 5/1978 | Eichler | ................. | H02J 7/0044 455/90.3 |
| 4,289,226 A * | 9/1981 | Wilkinson | .............. | B60L 53/31 194/297 |
| 5,645,439 A * | 7/1997 | Nugent, Jr. | .......... | H01R 13/635 439/923 |
| 5,800,189 A * | 9/1998 | Ahmed | .............. | H01R 13/7132 439/923 |
| 6,045,377 A * | 4/2000 | Kajiura | .................. | G06K 13/08 439/159 |
| 8,944,477 B2 * | 2/2015 | Proefke | ................... | B60L 53/16 292/144 |
| 9,056,555 B1 * | 6/2015 | Zhou | ....................... | B60L 53/35 |
| 9,365,116 B2 * | 6/2016 | Staley | .................. | B60L 53/305 |
| 2004/0242039 A1 * | 12/2004 | Griffin | ................ | H05K 7/1409 439/157 |
| 2005/0111178 A1 * | 5/2005 | Bradley | ............... | H05K 7/1411 360/99.06 |
| 2006/0014407 A1 * | 1/2006 | Wahler | ................ | G06K 13/085 439/159 |
| 2010/0241299 A1 * | 9/2010 | Ito | .......................... | B60L 53/18 320/109 |
| 2013/0257373 A1 * | 10/2013 | Mallon, IV | ............... | F16L 3/16 248/65 |
| 2014/0021915 A1 * | 1/2014 | Staley | ...................... | H02J 7/00 439/153 |
| 2015/0037994 A1 * | 2/2015 | Nakajima | ............ | H01R 13/631 439/304 |

(Continued)

*Primary Examiner* — Gary F Paumen
(74) *Attorney, Agent, or Firm* — Kirton McConkie; Brian Tucker (57) ABSTRACT

An ejector can be used to automatically eject charging connectors of electric vehicle chargers. The ejector can be configured to be secured to any of a variety of charging connectors for electric vehicles. The ejector can include an ejector mechanism that is configured to force the charging connector out from the charging port. The ejector can also include circuitry by which the ejector mechanism can be controlled via a wired and/or wireless interface.

20 Claims, 11 Drawing Sheets

(56) References Cited

U.S. PATENT DOCUMENTS

| | | | | |
|---|---|---|---|---|
| 2016/0059804 A1* | 3/2016 | Dubrovsky | ............. | B60L 53/68 |
| | | | | 307/9.1 |
| 2016/0380378 A1* | 12/2016 | Makwinski | .............. | H02G 3/12 |
| | | | | 439/131 |
| 2020/0366028 A1* | 11/2020 | Krucinski | ............ | H01R 24/005 |
| 2020/0384882 A1* | 12/2020 | Falls | .................... | H02J 7/0045 |
| 2021/0298228 A1* | 9/2021 | Unruh | .................... | A01C 11/04 |
| 2022/0258629 A1* | 8/2022 | Hanchett | ............... | B60L 53/302 |

\* cited by examiner

EJECTOR FOR ELECTRIC VEHICLE CHARGING CONNECTORS

CROSS-REFERENCE TO RELATED APPLICATIONS

N/A

BACKGROUND

Figure 1A:
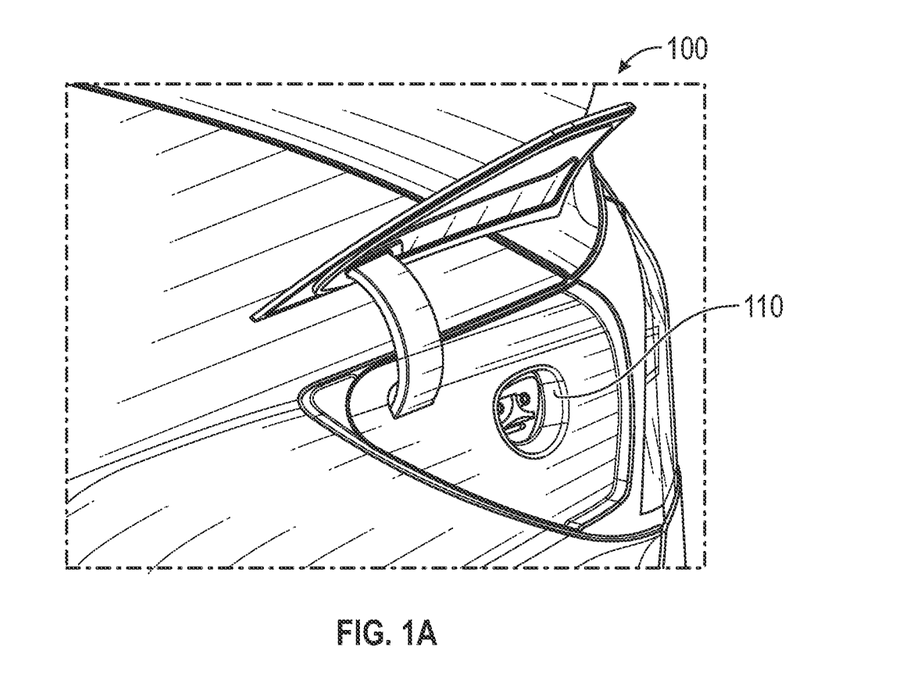
FIGS. 1A and 1B provide an example of how a charging connector is plugged into an electric vehicle's charging port to charge the electric vehicle.
Figure 1B:
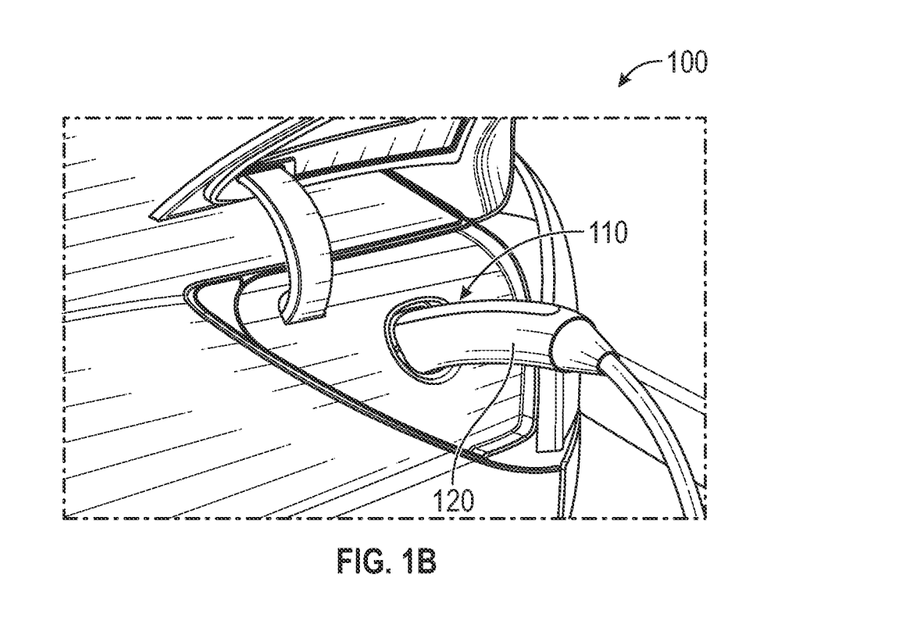

Electric vehicles (or EVs), whether cars, trucks or otherwise, must be frequently recharged. For this purpose, EVs have charging ports that are typically located on the side of the EV. FIGS. 1A and 1B provide an example of a Tesla 100 that has a charging port 110 into which a charging connector 120 can be plugged. Charging connector 120 can be electrically connected to a power source such as a 240-volt outlet at home or a public charging station. Other makes of EVs have similar charging ports that require similar charging connectors.

It can take a relatively long time to fully charge an EV. For example, with a typical 240-volt at-home charger, a full charge may take 8 hours. Even with high-voltage superchargers, it usually takes at least 30-40 minutes to reach a full charge.

Most EVs are designed to prevent any motion of the EV while the EV is connected to a charger. Therefore, the vehicle must remain parked while connected to the charger and cannot be shifted to drive, reverse, or neutral. Additionally, current charger designs require manual removal of the charging connector from the charging port. This can create various difficulties. For example, if a driver is in a rush to leave, he or she may forget to unplug the charger before getting into the EV. Similarly, if a driver's hands are full, he or she may have difficulty removing the charging connector from the charging port and managing the storage of the charging cable.

Greater difficulties may arise in scenarios where the driver is waiting in the EV while it charges. For example, a thunderstorm or other severe weather could occur when charging is complete thus forcing the driver to brave the elements to unplug the EV. As another example, a charging station may be in a remote or dangerous location where it may be unsafe for the driver to exit the EV such as due to the presence of wildlife or a lurking assailant. In such cases, the driver will in essence be trapped inside the EV given that he or she cannot drive away until the EV is unplugged.

BRIEF SUMMARY

The present invention extends to an ejector for electric vehicle charging connectors. The ejector can be configured to be secured to any of a variety of charging connectors for electric vehicles. The ejector can include an ejector mechanism that is configured to force the charging connector out from the charging port. The ejector can also include circuitry by which the ejector mechanism can be controlled via a wired and/or wireless interface.

In some embodiments, the present invention may be implemented as an ejector for a charger of an electric vehicle. The ejector can include a main body that is configured to be secured to a charging connector of a charger of an electric vehicle. The ejector may also include an ejector mechanism that includes a sliding member that is configured to slide between an extended position and a retracted position. The ejector may further include circuitry for causing the sliding member to slide from the retracted position to the extended position to thereby force the charging connector from a charging port of the electric vehicle.

In some embodiments, the main body may include a clamp that is configured to secure the main body to the charging connector.

In some embodiments, the ejector mechanism may include a ratcheting assembly that retains the sliding member in the retracted position.

In some embodiments, the sliding member and the ratcheting assembly may include teeth that retain the sliding member in the retracted position.

In some embodiments, the ratcheting assembly may include pivoting arms.

In some embodiments, the ejector mechanism may include an actuator assembly that causes the ratcheting assembly to release the sliding member from the retracted position.

In some embodiments, the actuator assembly may comprise a servo.

In some embodiments, the actuator assembly may include a releasing member that interfaces with a retracting assembly of the ejector mechanism.

In some embodiments, the retracting assembly may include pivoting arms from which posts extend and the releasing member may include channels within which the posts are positioned. The channels may cause the posts to be forced towards one another as the releasing member is slid relative to the pivoting arms.

In some embodiments, the circuitry may comprise a controller and a motor. The controller may cause the motor to actuate the ejector mechanism to cause the sliding member to slide from the retracted position to the extended position in response to an external signal.

In some embodiments, the external signal is received via a wired connection or a wireless connection.

In some embodiments, the circuitry may comprise a battery for powering the motor.

In some embodiments, the sliding member may include a push arm that abuts the electric vehicle when the main body is secured to the charging connector.

In some embodiments, the present invention may be implemented as an ejector for a charger of an electric vehicle. The ejector may include a main body that is configured to be secured to a charging connector of a charger of an electric vehicle and an ejector mechanism that includes a sliding member, a ratcheting assembly and an actuator assembly. The sliding member may slide relative to the main body between an extended position and a retracted position and may be biased into the extended position. The ratcheting assembly may retain the sliding member in the retracted position. The actuator assembly may release the sliding member from the retracted position.

In some embodiments, the ratcheting assembly may include pivoting arms that retain the sliding member in the retracted position.

In some embodiments, the actuator assembly may be configured to move the pivoting arms to release the sliding member from the retracted position.

In some embodiments, the ejector further includes circuitry for causing the actuator assembly to release the sliding member from the retracted position.

In some embodiments, the circuitry may cause the actuator assembly to release the sliding member from the retracted position in response to an external signal.

In some embodiments, the present invention may be implemented as an ejector for a charger of an electric vehicle. The ejector may include a main body, an ejector mechanism and circuitry. The ejector mechanism may include a sliding member that is configured to slide between a retracted position and an extended position when the main body is secured to a charging connector of a charger of an electric vehicle while the charging connector is connected to a charging port of the electric vehicle. The circuitry may be configured to receive a signal from an external source and, in response to receiving the signal, cause the ejector mechanism to move the sliding member into the extended position to thereby force the charging connector from a charging port of the electric vehicle.

In some embodiments, the external source may be a wireless transmitter, an adapter into which the charger is plugged, or one or more sensors positioned on the charger.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "frontward" or "frontwardly" will be used to designate a component that would be nearer to the charging port of an EV during use, while the term "rearward" or "rearwardly" will be used to designate a component that is farther from the charging port. Similarly, the term "inward" may be used to designate movement in a rearward direction that is into an ejector, while the term "outward" may be used to designate movement in a frontward direction that is out from the ejector.

An ejector configured in accordance with one or more embodiments of the present invention can be attached to or integrated into a charging connector of an electric vehicle charger to allow the charging connector to be automatically ejected from the charging port. In some embodiments, the ejector may be automatically ejected in response to detecting that charging has been completed. In some embodiments, the ejector may be automatically ejected in response to a driver's or other user's signal such as via a fob, mobile device or a control inside the EV.

Figure 2:
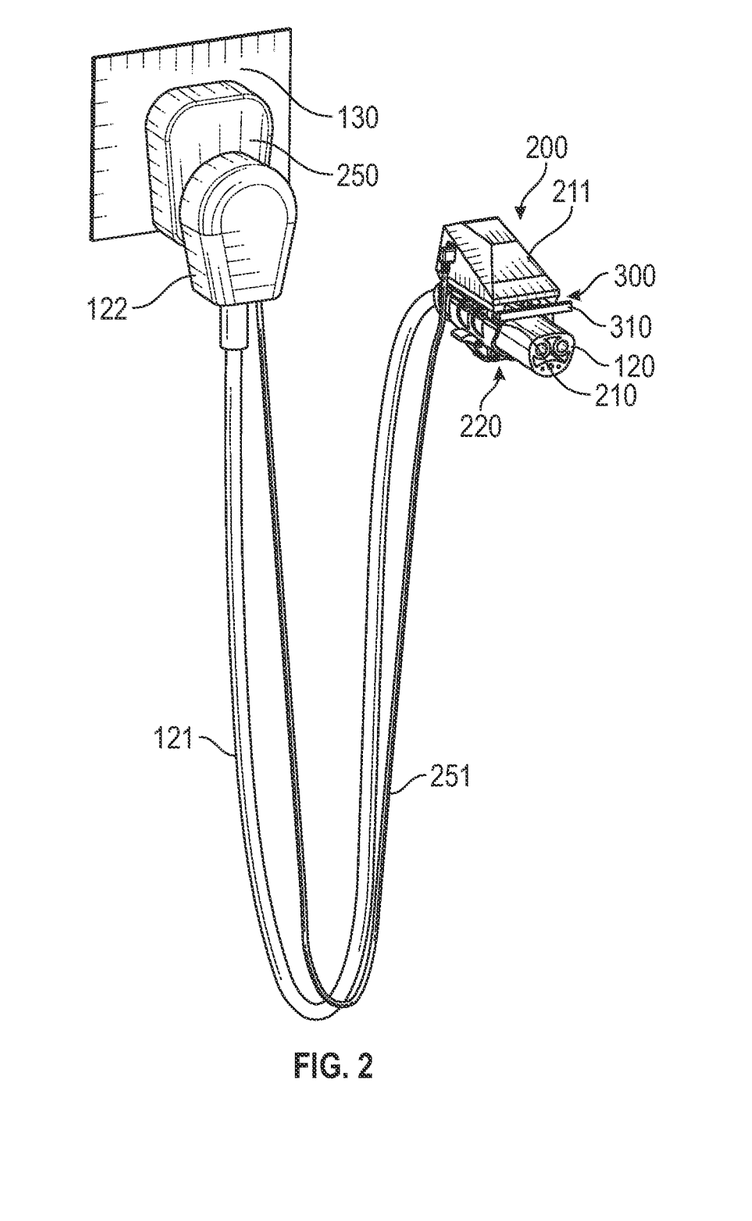
FIG. 2 provides an example of an ejector that is configured in accordance with one or more embodiments of the present invention when secured to a charging connector.
Figure 2A:
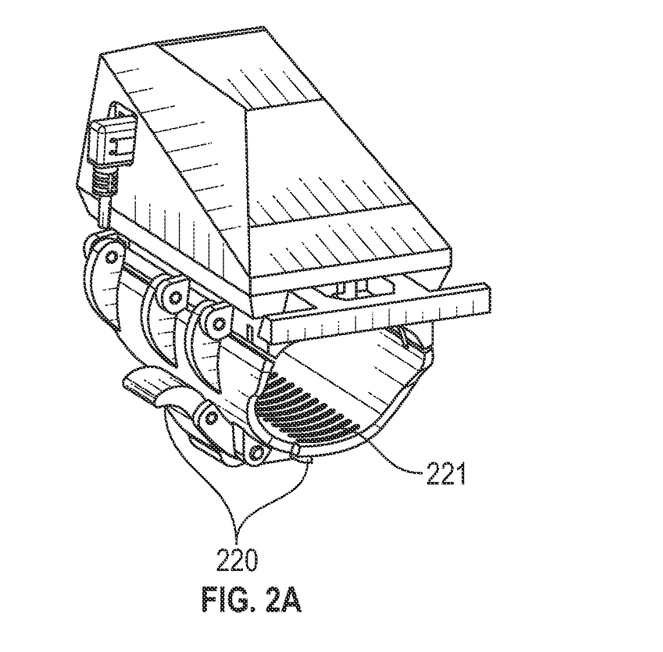
FIG. 2A shows the ejector of FIG. 2 in isolation.

FIG. 2 provides an example of an ejector 200 that is configured in accordance with one or more embodiments of the present invention. Ejector 200 includes a main body 210 that can be configured to be secured to a charging connector for any electric vehicle such as charging connector 120. For example, ejector 200 may include a clamp 220 which could be in the form of a toggle clamp. When locked, clamp 220 may retain main body 210 tightly against charging connector 120. However, any suitable mechanism for securing ejector 200, and particularly main body 210, to a charging connector could be employed. In some embodiments, an inner surface of clamp 220 and/or main body 210 may include gripping members 221 (see FIG. 2A) to prevent charging connector 120 from slipping relative to ejector 200.

A cover 211 may be secured to main body 210 overtop circuitry (described below) which may control an ejector mechanism 300. Among other components, ejector mechanism 300 may include a sliding member 310 which can be selectively forced against the portion of the EV that surrounds charging port 110 to thereby force charging connector 120 from charging port 110.

FIG. 2 shows that charging connector 120 is connected via a cable 121 to plug 122 which can be plugged into an outlet 130 to provide power to charging connector 120. Therefore, FIG. 2 can typically represent an in-home charging scenario but could also represent any scenario where the charger may be powered from an external source such as an outlet. FIG. 2 also represents an embodiment where ejector 200 is configured to interface with an adapter 250. Adapter 250 can function as a passthrough device that can be plugged into outlet 130 and that can receive plug 122. For example, as is better shown in FIG. 3, adapter 250 may include prongs 250a and receptacles 250b which could match a standard 240-volt outlet.

Figure 3:
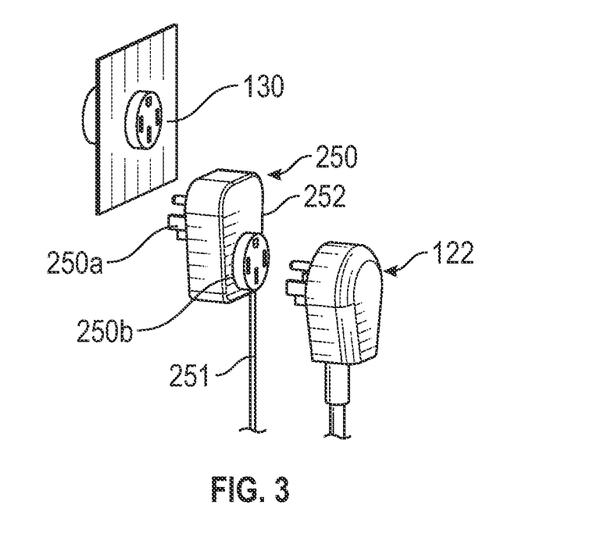
FIG. 3 provides an example of an outlet adapter that may be used with the ejector of FIG. 2 in one or more embodiments.

Adapter 250 can include internal circuitry 252 which, in some embodiments, can provide various types of functionality. For example, internal circuity 252 can be configured to detect whether current is flowing and/or the amount of current that is flowing through adapter 250 to thereby detect when charging has completed. Chargers for most electric vehicles are designed to cut off current flow once the battery has reached a full charge. Therefore, internal circuitry 252 can be configured to monitor the current flow from outlet 130 to plug 122 to detect when current flow is cut off.

Internal circuitry 252 can also be configured to send control signals to ejector 200 via cable 251 and/or wirelessly. For example, internal circuitry 252 could send a control signal notifying ejector 200 when current has been cut off (i.e., when charging is complete). In some embodiments, internal circuitry 252 may also be configured to function as a voltage adapter to thereby provide power via wire 251 for powering ejector 200. However, in some embodiments, ejector 200 could be configured to be powered only by a battery. Accordingly, even in embodiments where ejector 200 interfaces with adapter 250, there need not be a wire that connects the components, but any communications could occur wirelessly.

Figure 4A:
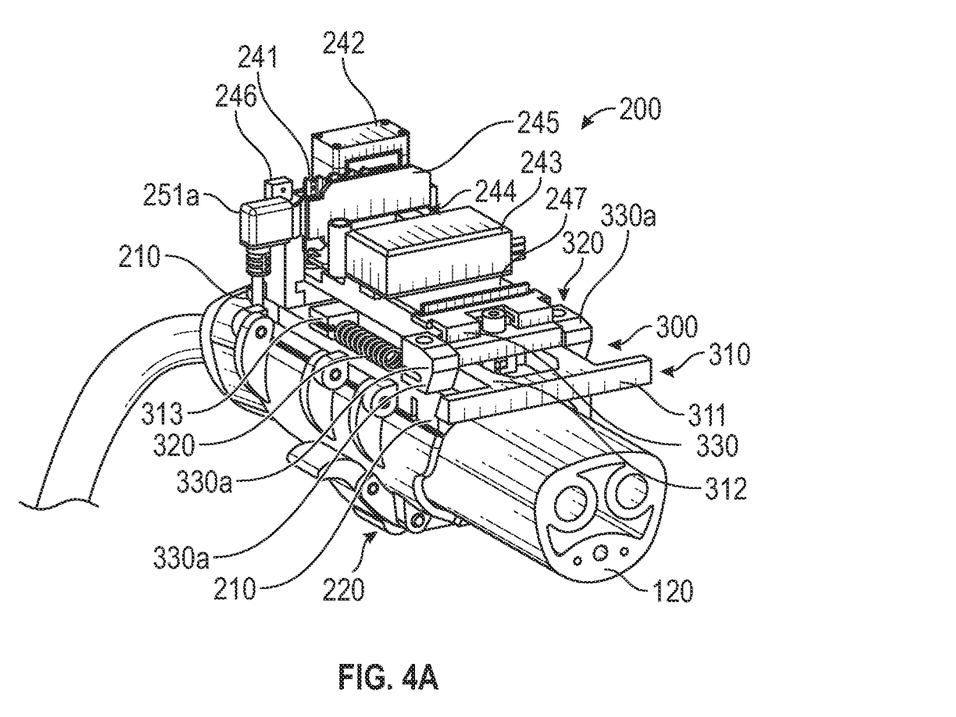
FIGS. 4A and 4B show the ejector of FIG. 2 with a cover removed and with an ejector mechanism in an extended and retracted position respectively.
Figure 4B:
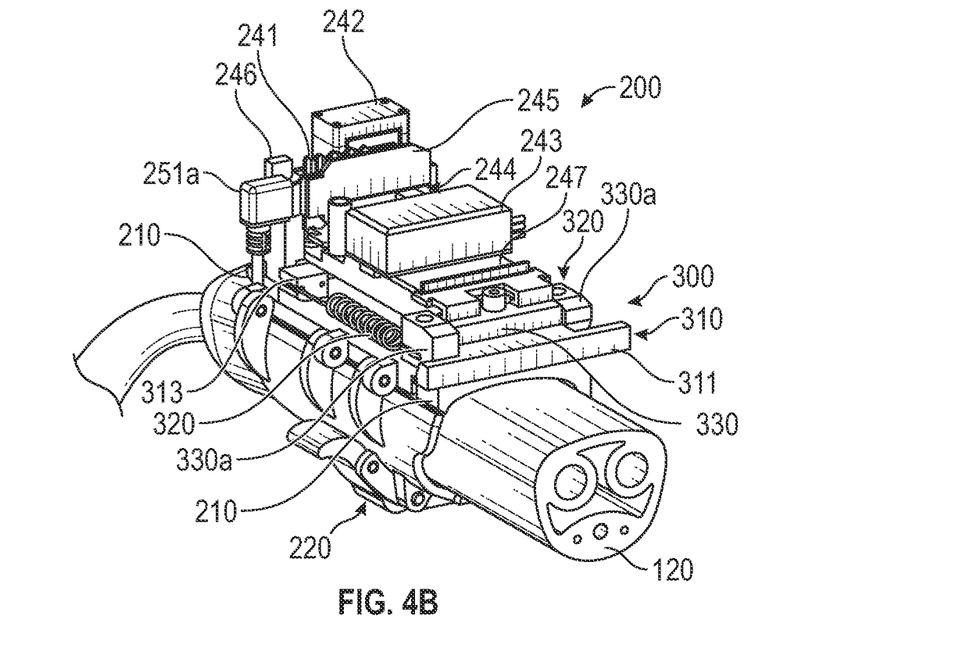

FIGS. 4A and 4B show ejector 200 with cover 211 removed to thereby reveal its circuitry and portions of ejector mechanism 300. In FIG. 4A, sliding member 310 is in its extended position, which is the position in which sliding member 310 would be after ejector 200 has ejected charging connector 120 from charging port 110. In FIG. 4B, sliding member 310 is in its retracted, or loaded, position, which is the position in which sliding member 310 would be prior to ejecting charging connector 120. Notably, to use ejector 200, the user can move sliding member 310 into its retracted position, and then with charging connector 120 plugged into charging port 110, can ensure that a push arm 311 of sliding member 310 abuts or is adjacent to the portion of the EV surrounding charging port 110. For example, the user could "load" ejector 200 and then use latch 220 to secure it to charging connector 120 with push arm 311 against the EV. Alternatively, ejector 200 may already be secured to charging connector 120 in which case, the user can load it and then insert charging connector 120 into charging port 110. It is also possible that the user could load ejector 200 as part of inserting charging connector 120 into charging port 110.

The circuitry of ejector 200 can vary based on the particular use case. Such circuitry can be supported on a plate 247 that may sit on top of a sliding member cover 330 that is positioned overtop sliding member 310. Accordingly, sliding member 310 can slide between main body 210 and sliding member cover 330. Sliding member 310 can include rear flanges 313 that extend outwardly from each side of sliding member 310. A rear end of springs 320 can be attached to rear flanges 313. The front end of springs 320 can be attached to front flanges 330a of sliding member cover 330. However, any configuration that enables sliding member 310 to be biased towards the charging port could be used.

As shown in FIG. 4B, as sliding member 310 is slid rearwardly into ejector 200, springs 320 will be stretched to load sliding member 310. As described below, ejector mechanism 300 can be configured to retain sliding member 310 in this loaded position. Then, the circuitry can cause sliding member 310 to be released, at which point springs 320 will cause push arm 311 to press against the EV and force charging connector 120 out from charging port 110.

In some embodiments, the circuitry of ejector 200 may include a controller 241 (e.g., an integrated circuit, FPGA, CPU, etc.), a servo 242, a battery 243, a transceiver 244, a balancing charger 245, and a switch 246, among possibly other circuitry. Controller 241 can include a physical interface (e.g., a USB interface) by which a connector 251a of cable 251 may be connected. Controller 241 can be configured to interface with the other circuitry to enable/provide the functionality described herein.

As described in detail below, servo 242 can be coupled to ejector mechanism 300 to release sliding member 310 through rotational motion. However, other circuitry and/or mechanisms for releasing sliding member 310 could be used. Battery 243 can be used to power the circuitry when cable 251 is not connected or power is not otherwise provided. Also, in some embodiments, battery 243 may be the only source of power for ejector 200. Balancing charger 245 can be used in some embodiments such as when battery 243 is a lithium-ion polymer (LiPo) battery or otherwise requires balanced charging. Transceiver 244 can provide wireless communication capabilities for ejector 200 such as for receiving signals from a fob, a mobile device or other transmitter including a transmitter integrated into the EV. Switch 246 can be used to control whether ejector 200 is in operational mode or charging mode.

Figure 5A:
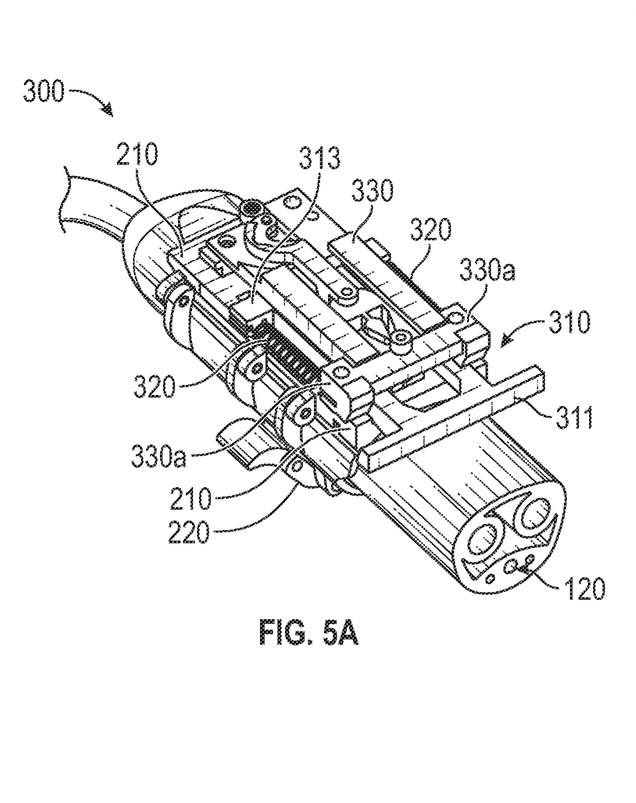
FIGS. 5A and 5B show the ejector of FIG. 2 with various components removed to better reveal the ejector mechanism.
Figure 5B:
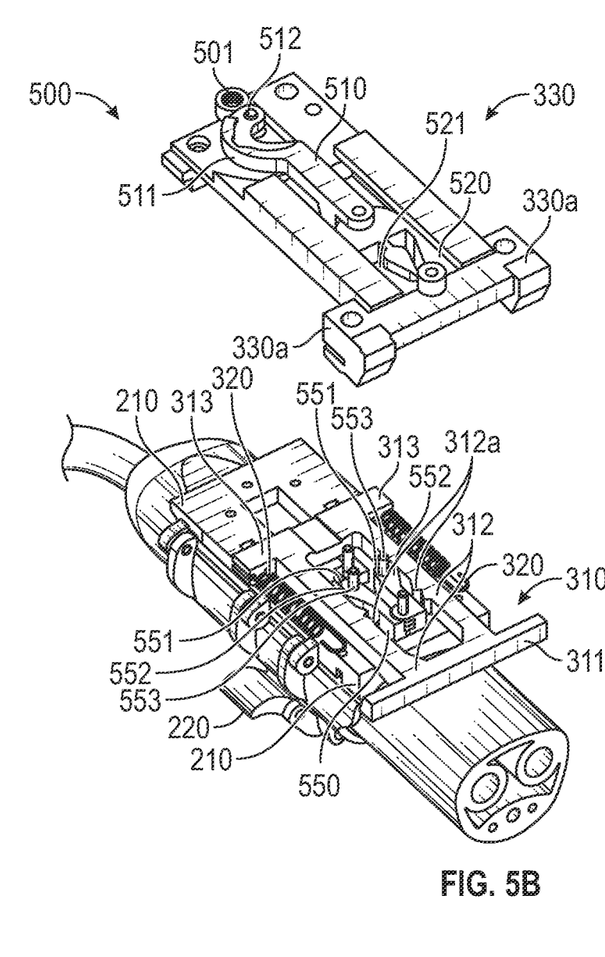

In FIG. 5A, the circuitry and plate 247 have been removed to better show ejector mechanism 300. In FIG. 5B, sliding member cover 330 is separated from main body 210 to better reveal a ratcheting assembly 550 of ejector mechanism 300. As best seen in these figures, ejector mechanism 300 may generally include sliding member 310, springs 320, sliding member cover 330, actuator assembly 500 and ratcheting assembly 550.

Sliding member 310 includes push arm 311, rear flanges 313 and spaced arms 312 that extend between push arm 311 and rear flanges 313. Springs 320 can be positioned along the outside of spaced arms 312. Ratcheting assembly 550 can be positioned between spaced arms 312 to thereby allow sliding member 310 to slide relative to ratcheting assembly 550.

Figure 6A:
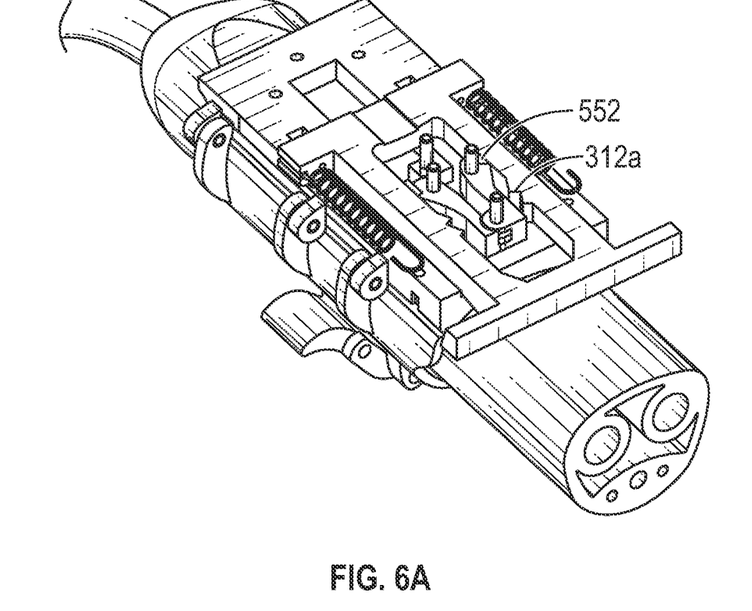
FIGS. 6A and 6B provide an example of how an ejector mechanism can retain a sliding member in a retracted position.
Figure 6B:
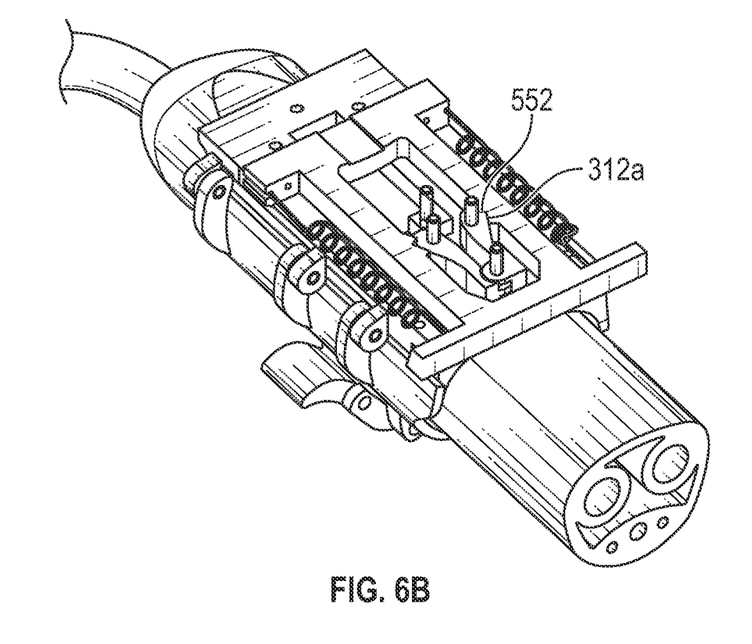

Ratcheting assembly 550 can include pivoting arms 551 that have outwardly oriented teeth 552 that are configured to interlock with inwardly oriented teeth 312a on spaced arms 312. Teeth 552 and 312a can be configured to allow sliding member 310 to be slid inwardly into ejector 200 to reach the retracted position. Teeth 552 and 312a may then lock sliding member 310 in the retracted position. For example, as is represented in FIGS. 6A and 6B, pivoting arms 551 can be outwardly biased by a spring (not visible) but may pivot inwardly to allow teeth 312a to pass rearwardly by teeth 552. Then, due to the outward biasing of pivoting arms 551, teeth 552 will contact teeth 312a and prevent sliding member 310 from sliding frontwardly even though springs 320 will apply a strong frontward pulling force on sliding member 310.

Returning to FIGS. 5A and 5B, actuator assembly 500 is configured to release sliding member 310 from the retracted position. Actuator assembly 500 includes a gear 501 that servo 242 drives, an actuator arm 510 that is coupled to gear 501 and a releasing member 520 that is coupled to actuator arm 510 and configured to release teeth 552 from teeth 312a. Gear 501 may be coupled to actuator arm 510 via a connection point 512 that is positioned next to gear 501. Accordingly, as servo 242 rotates gear 501, connection point 512 will rotate around gear 501. Actuator arm 510 can include a c-shaped region 511 to allow pivot point 512 to be rotated towards the rear of gear 501 without causing actuator arm 510 to contact gear 501.

Releasing member 520 can include channels 521 for receiving posts 553 that extend upwardly from pivoting arms 551. As channels 521 extend frontwardly, they become closer together. For example, channels 521 may form a v-shape. At the rear ends of channels 521, the width of channels 521 may be increased to allow posts 553 to move towards one another. In particular, when sliding member 310 is pushed into ejector 200, the widened rear ends of channels 521 will allow posts 553, and therefore pivoting arms 551, to move closer together as teeth 552 pass rearwardly beyond teeth 312a. The ramped surfaces of teeth 553 and 312a facilitate this pivoting of pivoting arms 551.

Figure 7A:
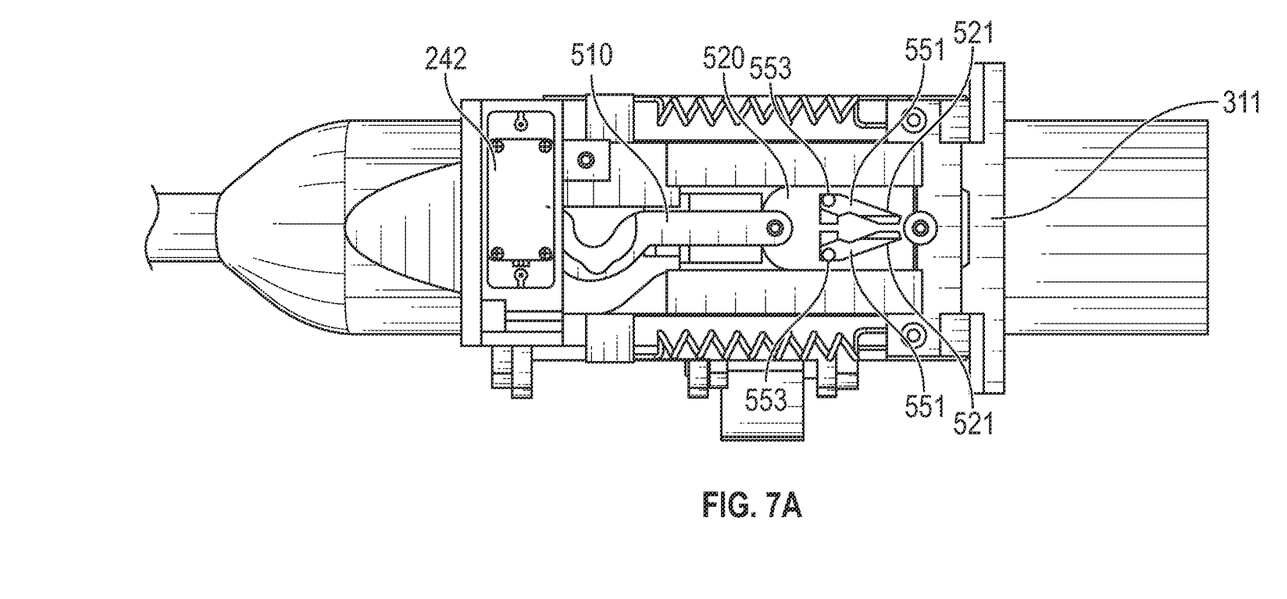
FIGS. 7A and 7B provide an example of how an actuator assembly can be used to trigger the release of a sliding member to thereby eject a charging connector from a charging port.
Figure 7B:
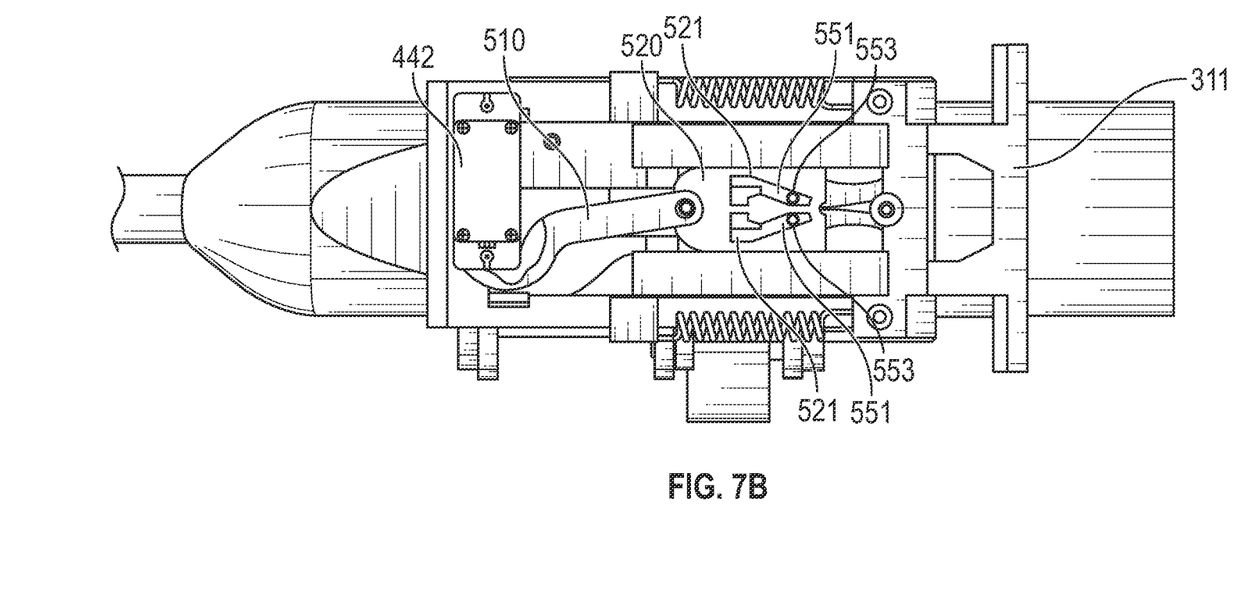

As is better represented in FIGS. 7A and 7B, because channels 521 become closer together as they extend frontwardly, when releasing member 520 is pulled rearwardly, channels 521 will force posts 553, and therefore pivoting arms 551, closer together. As a result of this rearward pulling of releasing member 520, teeth 552 will be freed from teeth 312a. Once teeth 552 are freed from teeth 312a, springs 320 will force pushing arm 311 frontward. Because pushing arm 311 is positioned against the EV and because ejector 200 is secured to charging connector 120, as pushing arm 311 is forced frontward into its extended position, charging connector 120 will be forced out from charging port 110.

As suggested above, ejector 200 could be actuated in a variety of ways. In some embodiments, the driver (or other user) could employ a fob or other transmitter to send a signal when he or she desires that the charging connector be ejected. In such cases, controller 241 could detect the signal, such as via transceiver 244, and actuate servo 242 in response. In this way, the driver could cause the charging connector to be ejected whenever he or she desires including without leaving the EV.

In some embodiments, adapter 250 could monitor the current that the EV is drawing while charging and, upon detecting that current flow has ceased, send a signal to controller 241, such as via cable 251. In response, controller 241 could actuate servo 242 to cause the charging connector to be automatically ejected. In this way, ejector 200 could eject charging connector without any human involvement.

In some embodiments, ejector 200 could be configured for one-time use such as when the driver connects ejector 200 to a public charger and uses it to eject the charging connector without leaving the EV. In other embodiments, ejector 200 could be permanently installed on the charging connector such as when ejector 200 is used on an in-home charger.

In some embodiments, a retracting mechanism such as a reel or bungee may be connected to ejector 200 and/or the charging connector to thereby pull the charging connector away from the EV as it is ejected. Such a retracting mechanism can minimize the risk of damage to the EV, charging connector 120, ejector 200 or any surrounding structure, item or individual.

Figure 8A:
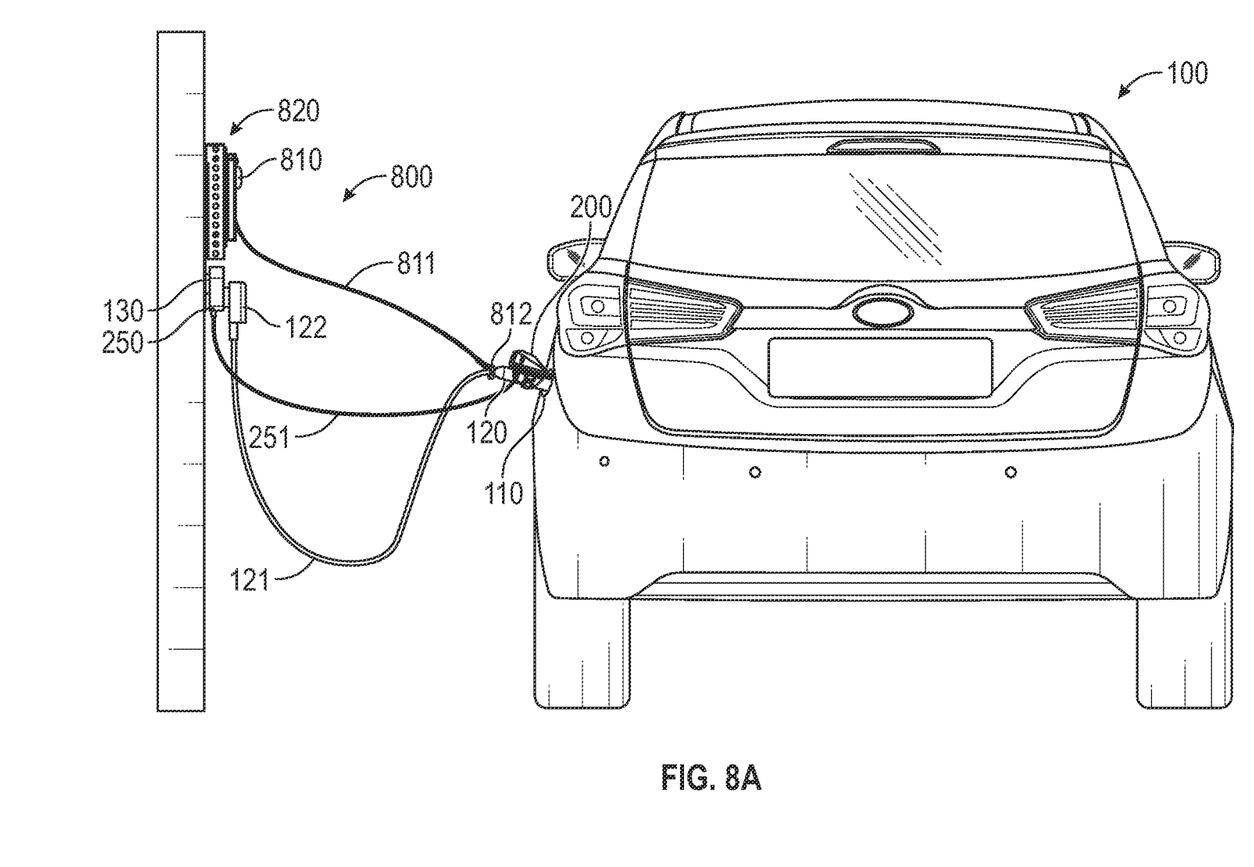
FIGS. 8A-8C provide an example of how an ejector can automatically eject a charging connector from an electric vehicle's charging port.
Figure 8B:
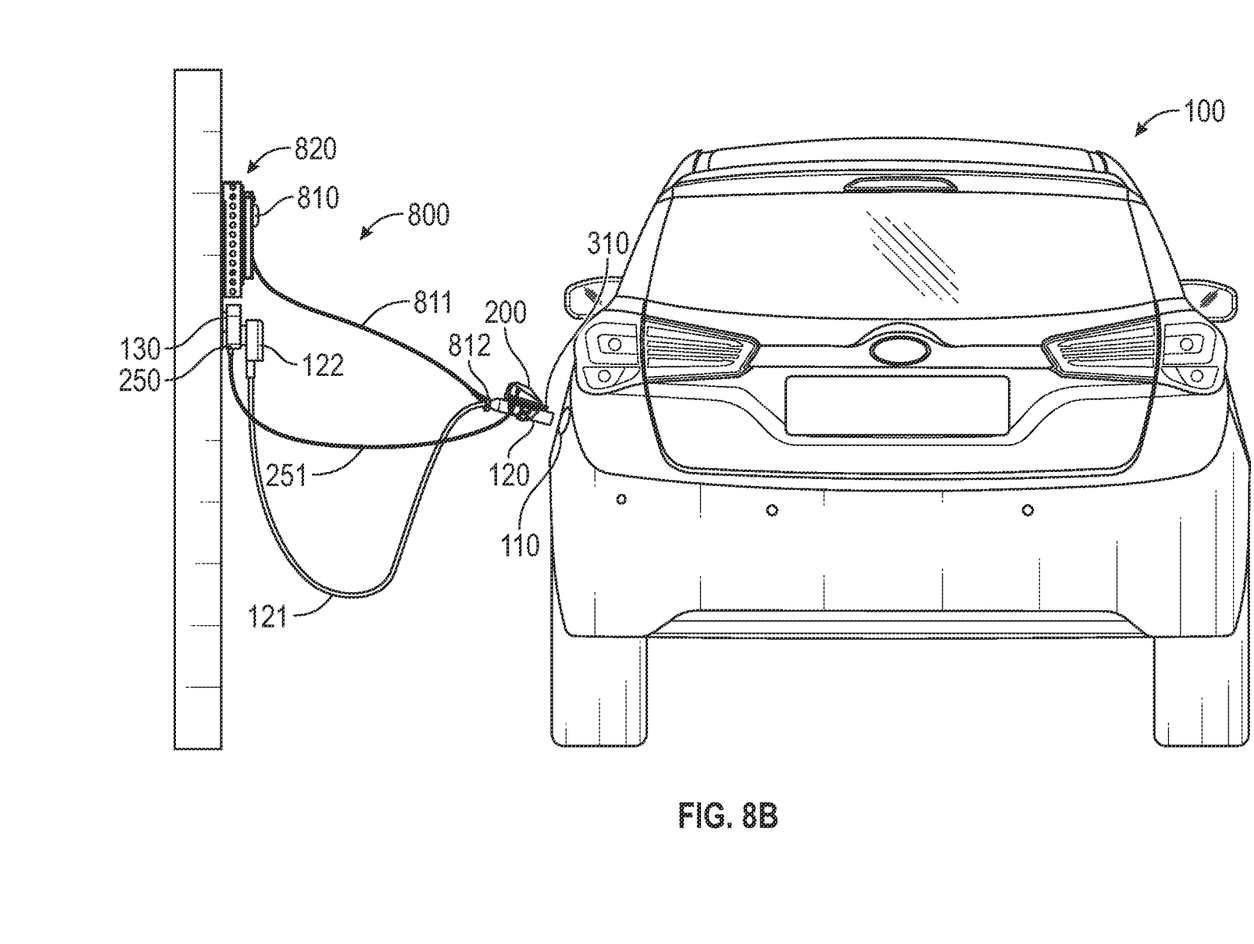
Figure 8C:
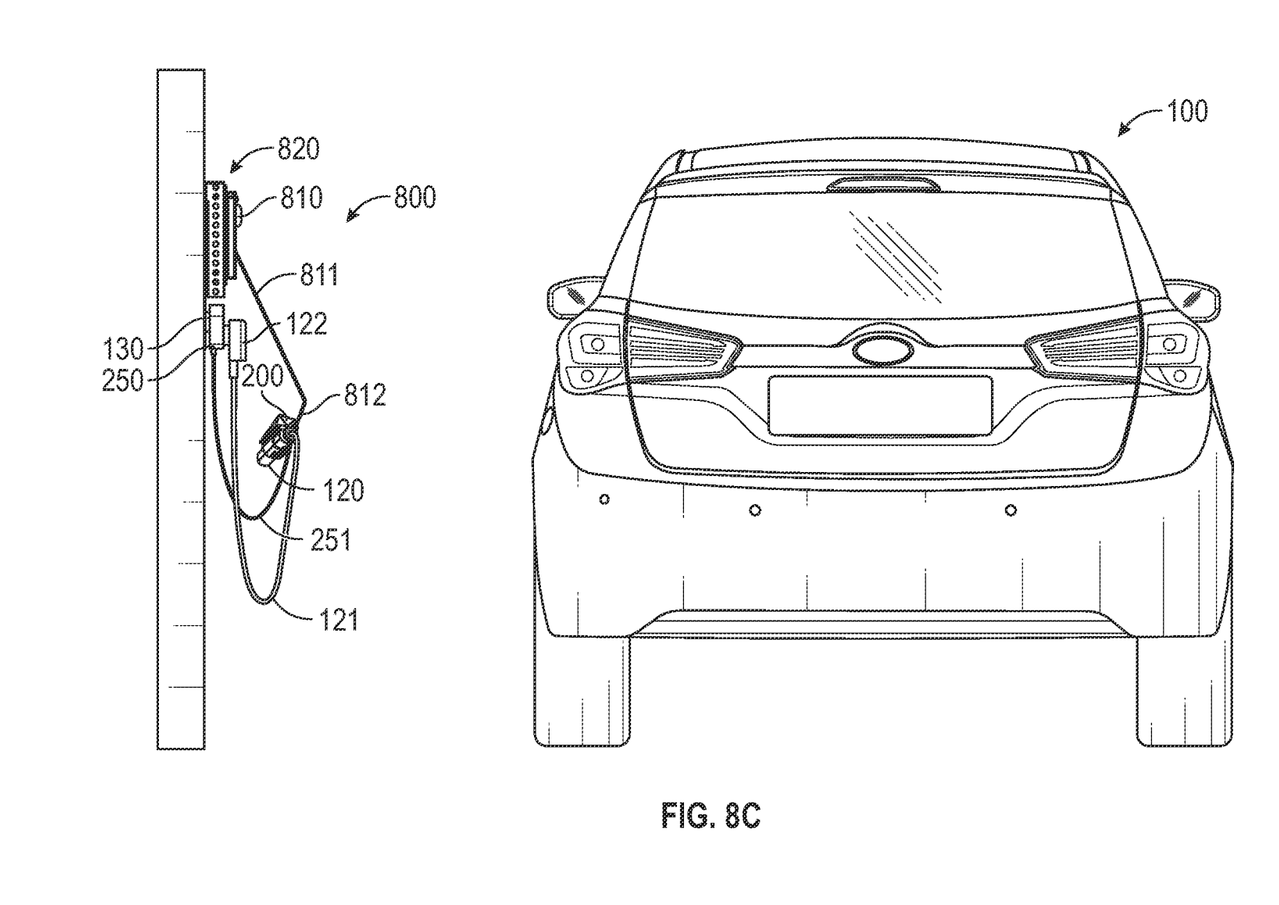

FIGS. 8A-8C provide an example of how ejector 200 may automatically eject charging connector 120 from charging port 110 and also provides an example of how a retracting mechanism 800 may be used to prevent charging connector 120 from striking electric vehicle 100, the floor or another surface. In FIG. 8A, charging connector 120 is inserted into charging port 110 and ejector is loaded (i.e., sliding member 310 is in its retracted position). In the depicted embodiment, retracting mechanism 800 includes a reel 810 that is secured to a support structure 820 on the wall. Reel 810 may include a wire 811 that is connected to charging connector 120 via a connector 812. When retracting mechanism 800 is used on a supercharger, reel 810 could be coupled to the supercharger or to a support structure mounted to or near the supercharger.

In FIG. 8B, ejector 200 has been actuated thus causing sliding member 310 to slide into its extended position. As a result, charging connector 120 has been forced out from charging port 110. As this occurs, reel 810 will retract wire 811 which in turn will pull charging connector 120 towards the wall. Accordingly, charging connector 120 will be prevented from striking EV 100 and from falling towards the ground once it is ejected from charging port 110.

In FIG. 8C, charging connector 120 is hanging from support structure 820 near outlet 130. Retracting mechanism 800 can retain charging connector 120 in this position until the driver again desires to charge EV 100. In some embodiments, reel 810 may be configured to cause charging connector 120 to hang at a desired height such as the height that is most convenient for the driver.

In some embodiments, one or more sensors could be used to detect current flow through cable 121 as opposed to using adapter 250. In such cases, the sensors could interface with controller 241 to notify controller 241 when charging has been completed.

In some embodiments, springs 320 could be replaced with a $CO_2$ cartridge that could provide the force for moving pushing arm 311 from the retracted position to the extended position. Such embodiments could be preferred for the elderly or others who may not have the strength to force pushing arm 311 into ejector 200.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. An ejector for a charger of an electric vehicle, the ejector comprising:
   a main body that is configured to be secured to a charging connector of a charger of an electric vehicle;
   an ejector mechanism that includes a sliding member that is configured to slide within the main body between an extended position and a retracted position; and
   circuitry for causing the sliding member to slide from the retracted position to the extended position to thereby push against the electric vehicle to force the charging connector from a charging port of the electric vehicle.

2. The ejector of claim 1, wherein the ejector mechanism includes a ratcheting assembly that retains the sliding member in the retracted position.

3. The ejector of claim 2, wherein the sliding member and the ratcheting assembly include teeth that retain the sliding member in the retracted position.

4. The ejector of claim 3, wherein the ratcheting assembly includes pivoting arms.

5. The ejector of claim 2, wherein the ejector mechanism includes an actuator assembly that causes the ratcheting assembly to release the sliding member from the retracted position.

6. The ejector of claim 5, wherein the actuator assembly comprises a servo.

7. The ejector of claim 5, wherein the actuator assembly includes a releasing member that interfaces with a retracting assembly of the ejector mechanism.

8. The ejector of claim 7, wherein the retracting assembly includes pivoting arms from which posts extend and the releasing member includes channels within which the posts are positioned, the channels causing the posts to be forced towards one another as the releasing member is slid relative to the pivoting arms.

9. The ejector of claim 1, wherein the circuitry comprises a controller and a motor, the controller causing the motor to actuate the ejector mechanism to cause the sliding member to slide from the retracted position to the extended position in response to an external signal.

10. The ejector of claim 9, wherein the external signal is received via a wired connection or a wireless connection.

11. The ejector of claim 9, wherein the circuitry comprises a battery for powering the motor.

12. The ejector of claim 1, wherein the sliding member includes a push arm that abuts the electric vehicle when the main body is secured to the charging connector.

13. The ejector of claim 1, further comprising:
   a retracting mechanism that retracts the charging connector away from the charging port when the charging connector is forced from the charging port.

14. An ejector for a charger of an electric vehicle, the ejector comprising:
   a main body that is configured to be secured to a charging connector of a charger of an electric vehicle;
   an ejector mechanism that includes:

a sliding member that slides relative to the main body between an extended position and a retracted position, the sliding member being biased into the extended position;

a ratcheting assembly that retains the sliding member in the retracted position; and an actuator assembly that releases the sliding member from the retracted position to thereby cause the sliding member to push against the electric vehicle to force the charging connector from a charging port of the electric vehicle.

15. The ejector of claim 14, wherein the ratcheting assembly includes pivoting arms that retain the sliding member in the retracted position.

16. The ejector of claim 15, wherein the actuator assembly is configured to move the pivoting arms to release the sliding member from the retracted position.

17. The ejector of claim 13, further comprising:
    circuitry for causing the actuator assembly to release the sliding member from the retracted position.

18. The ejector of claim 17, wherein the circuitry causes the actuator assembly to release the sliding member from the retracted position in response to an external signal.

19. An ejector for a charger of an electric vehicle, the ejector comprising:
    a main body;
    an ejector mechanism that includes a sliding member that is configured to slide between a retracted position and an extended position when the main body is secured to a charging connector of a charger of an electric vehicle while the charging connector is connected to a charging port of the electric vehicle; and
    circuitry that is configured to receive a signal from an external source and, in response to receiving the signal, cause the ejector mechanism to move the sliding member into the extended position to thereby push against the electric vehicle to force the charging connector from a charging port of the electric vehicle.

20. The ejector of claim 19, wherein the external source is one or more of:
    a wireless transmitter;
    an adapter into which the charger is plugged;
    one or more sensors positioned on the charger; or
    a control mechanism of the electric vehicle.

* * * * *